Aug. 8, 1950        H. L. GRAPP        2,517,869
METHOD AND APPARATUS FOR HEATING ARTICLES
Filed May 18, 1944        4 Sheets-Sheet 1

Inventor
HERBERT L. GRAPP
Chas. E. Reif.
By Attorney.

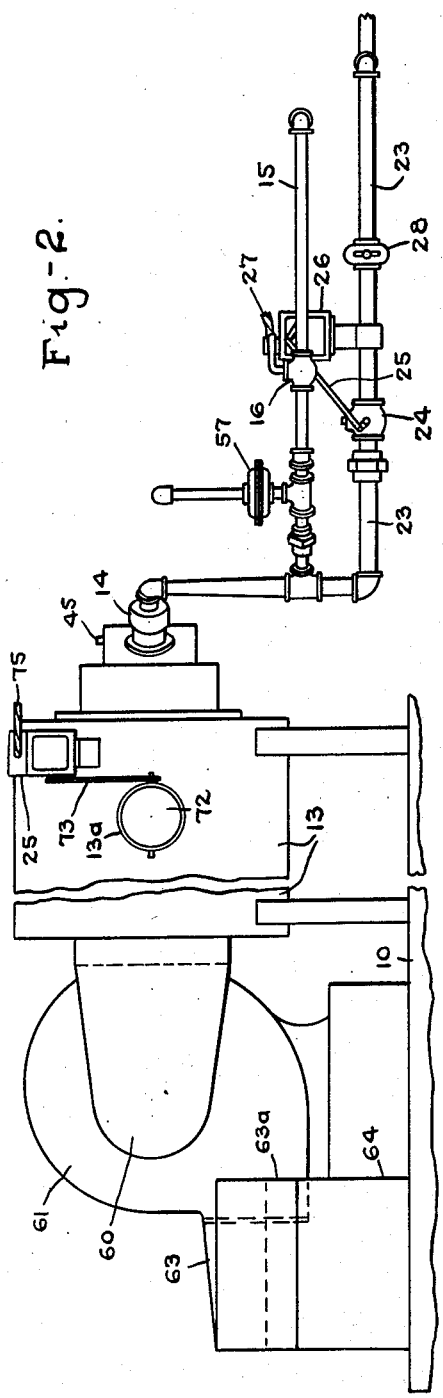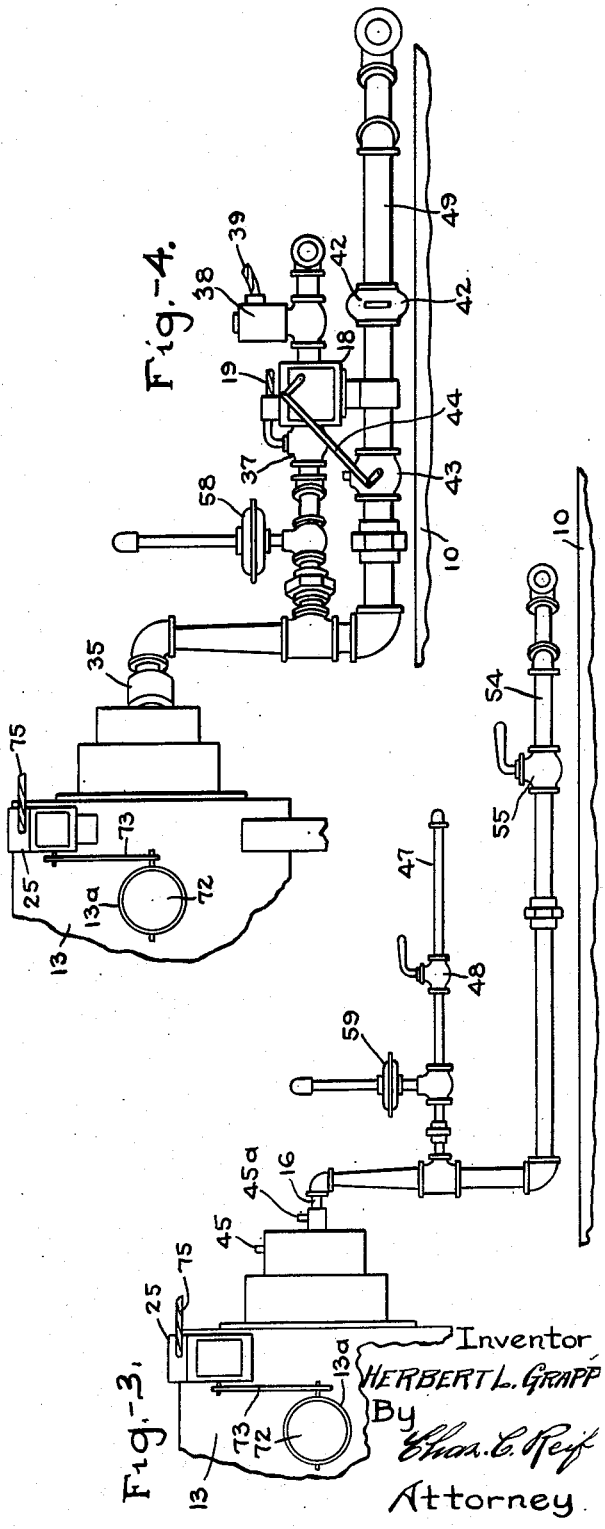

Aug. 8, 1950  H. L. GRAPP  2,517,869
METHOD AND APPARATUS FOR HEATING ARTICLES
Filed May 18, 1944  4 Sheets-Sheet 3

Inventor
HERBERT L. GRAPP
By Chas. E. Reif
Attorney.

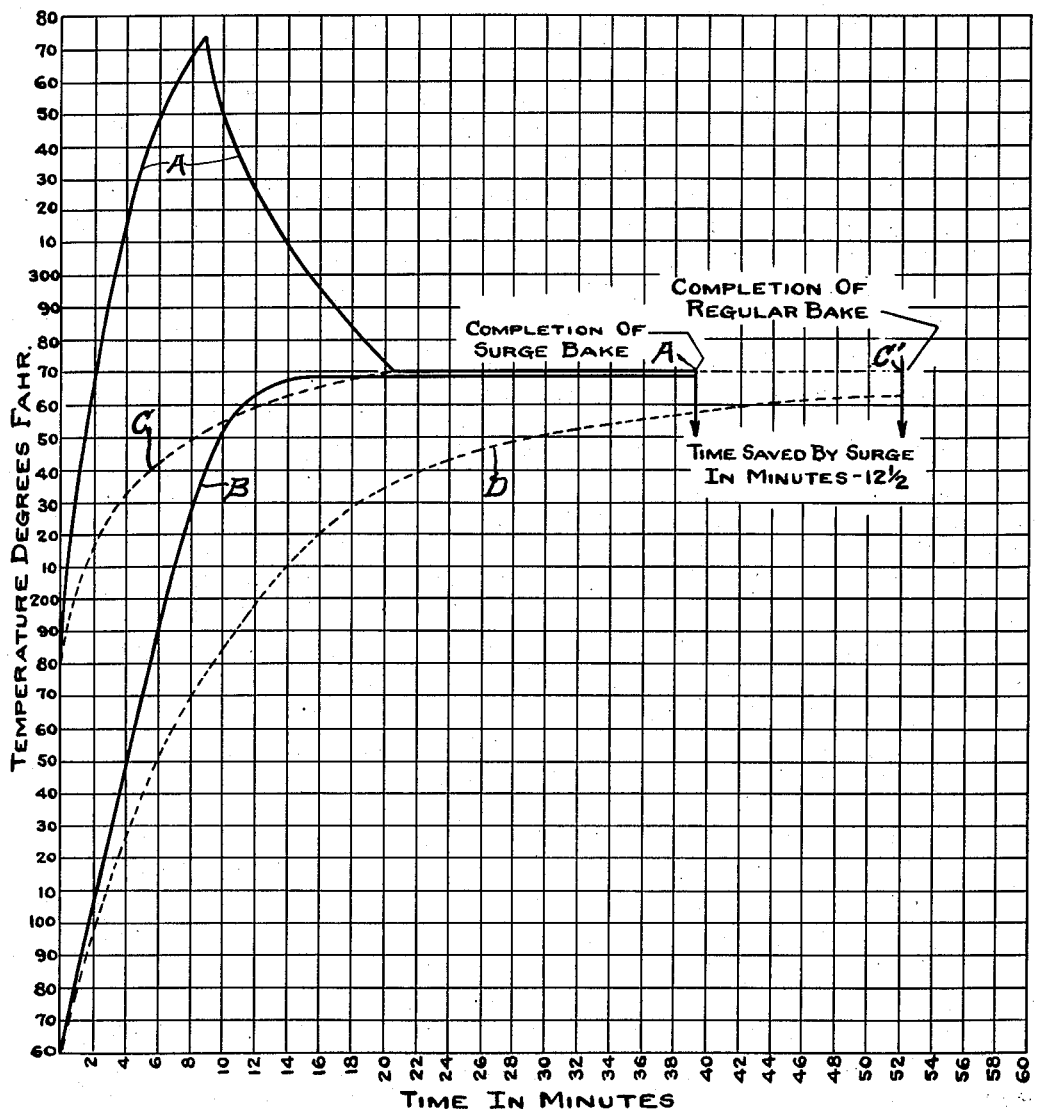

UNITED STATES PATENT OFFICE 2,517,869

METHOD AND APPARATUS FOR HEATING ARTICLES

Herbert L. Grapp, Minneapolis, Minn.; Albert E. Grapp and Northwestern National Bank of Minneapolis, executors of said Herbert L. Grapp, deceased, assignors of one-half to A. E. Grapp and Northwestern National Bank of Minneapolis, trustees Application May 18, 1944, Serial No. 536,183

3 Claims. (Cl. 263—40)

This invention relates to a method and apparatus for heating a furnace or heat treating chamber for heat-treating various articles in drying, baking, coating and other operations.

It has been the practice heretofore in heating a furnace or a heat-treating chamber adapted to receive articles which are to be treated at a certain temperature to supply heat thereto usually in the form of hot air or hot gases to gradually bring the temperature of said chamber up to a point which will cause said articles to be heated to a definite temperature and maintain said articles at said temperature for the desired period of time. There is always a lag in the temperature of the articles behind or under the temperature of the chamber. It has taken quite a long period to bring the temperature of the chamber to the desired point and has taken a longer period to bring the articles up to said definite temperature. It is important that the articles be brought to the definite temperature and also important that they be not raised to a much higher temperature or overheated. It is also necessary to maintain the articles at substantially said definite temperature for certain periods.

It is an object of this invention to provide a method of heating a heat-treating furnace or chamber which consists in initially supplying additional heat to said chamber to raise the temperature thereof to a much higher point than that which has heretofore been used to bring the articles treated up to a definite temperature, which additional heat is supplied until said articles are brought up substantially to the definite temperature after which said additional heat supply is discontinued and only the amount of heat necessary to maintain said articles at substantially said definite temperature is supplied. This results in much more quickly bringing the said articles up substantially to the definite temperature. A great deal of time is thus saved in the total period of heat-treatment of said articles.

It is also an object of the invention to provide a method of heating a heat-treating chamber which consists in supplying additional heat to said chamber at the beginning of the heat-treating period to quickly bring the articles to be heated up to a certain definite temperature and to then cut off the supply of said additional heat and subsequently supply only enough heat to maintain said articles at said definite temperature.

It is a further object of the invention to provide a method of heating a chamber in which articles are to be heat-treated, which consists in providing a normal heating means and an additional or auxiliary heating means, initially operating both of said heating means to bring the temperature of said chamber to a much higher point than is necessary to maintain said articles at the desired temperature, continuing said operation until said articles are brought substantially to the desired temperature, then discontinuing the operation of said heating means until the temperature in said chamber drops substantially to a point necessary to maintain said articles at said desired temperature and then operating only said normal heating means to maintain said articles at substantially said definite temperature for the desired period.

It is another object of the invention to provide an apparatus for heat-treating articles comprising a chamber to which heat is supplied and in which said articles are treated, a burner which might be called a normal burner for heating said chamber, an auxiliary burner which might be called a surge burner for applying additional heat to said chamber, means for initially operating both of said burners to bring the temperature of said chamber much above the point necessary to maintain said articles at the desired temperature, for bringing said articles substantially to a desired definite temperature, means for then discontinuing the operation of said burners until the temperature in said chamber falls to a point necessary to maintain said articles at substantially said definite temperature and means for then operating said normal burner to maintain said articles substantially at said definite temperature.

It is still another object of the invention to provide an apparatus for heating a chamber in which articles are to be heat-treated comprising a chamber, a normal heating means adapted to heat said chamber to a temperature for raising said articles to a desired definite temperature, an auxiliary heating means, a control device for said auxiliary heating means, means for operating both of said heating means to initially bring said chamber to a temperature much higher than the above mentioned temperature to quickly heat said articles to said desired temperature, means for discontinuing the operation of said heating means when said articles have attained substantially said definite temperature until the temperature of said chamber drops to substantially said first mentioned temperature, means for then operating said first mentioned heating means to maintain a temperature in said chamber which will maintain said articles at substantially said definite temperature.

It is still another object of the invention to provide an apparatus for heating a heat-treating chamber adapted to contain the articles to be heated comprising a regular means for supplying heat to said chamber, an auxiliary means for supplying additional heat to said chamber, together with means for operating both of said means to very quickly bring said articles up to a certain definite temperature, means for then discontinuing the operation of said heating means and means for subsequently operating only said regular means to maintain said articles at said definite temperature.

These and other objects and advantages of the invention will be fully set forth in the following description made in connection with the accompanying drawings in which like reference characters refer to similar parts throughout the several views and in which:

Fig. 2 is a view in side elevation of a portion of said chamber and a portion of said apparatus;

Fig. 3 is a partial view in side elevation showing other parts of said apparatus;

Fig. 4 is a partial view in side elevation showing further parts;

Fig. 6 is a view of certain graphs illustrating the method.

Figure 1:
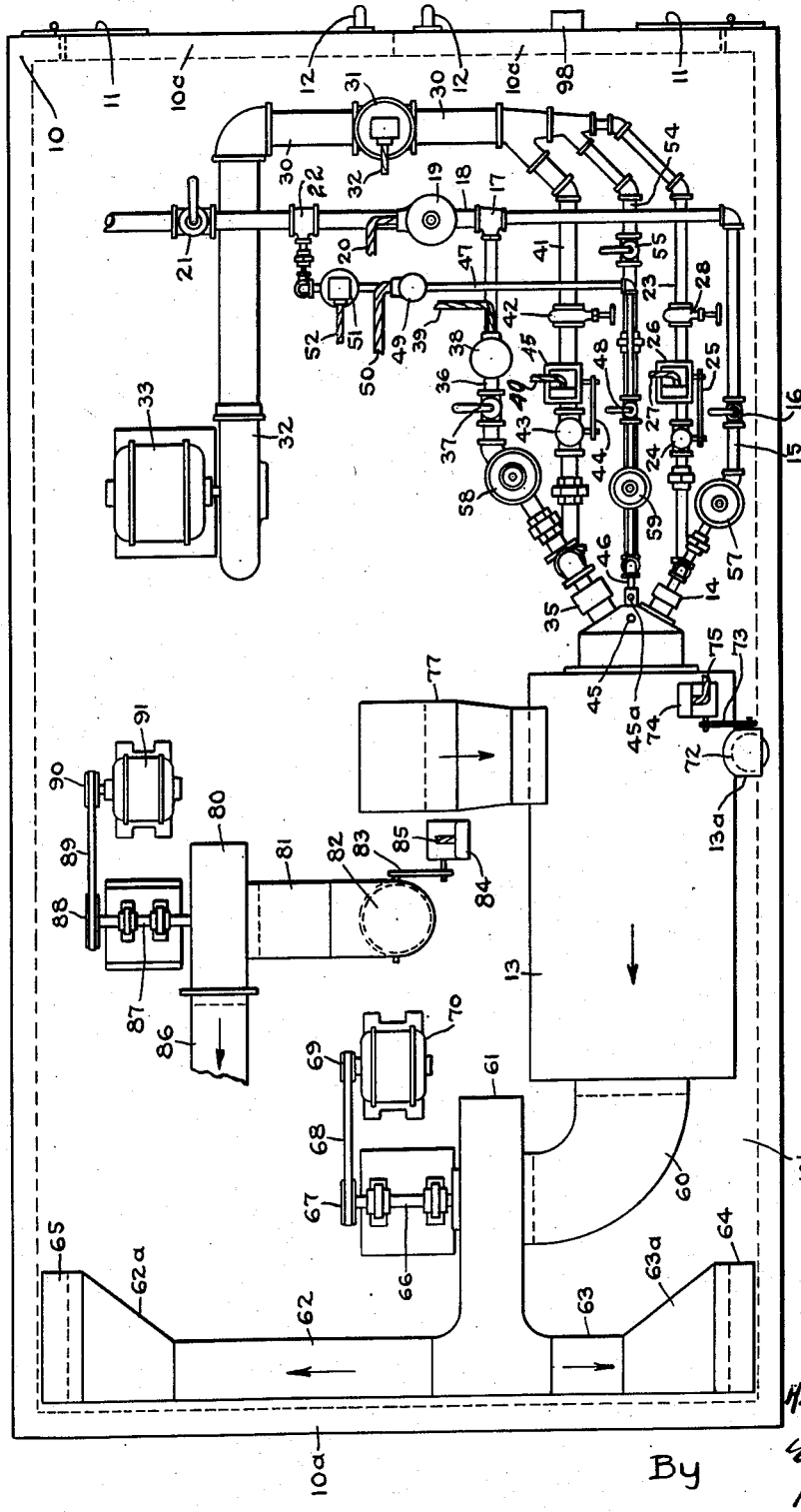
Fig. 1 is a somewhat diagrammatic view of a heat-treating chamber and heating and control means therefor.

Referring to the drawings an oven or heat-treating furnace 10 is shown illustrated as of general rectangular form in plan having a rather thick wall 10a which will comprise insulating material, said oven or furnace having a heat-treating chamber 10b therein. Furnace or oven 10 is illustrated as having doors 10c at one end mounted on hinges 11, the same being shown as having handles 12. Mounted on or adjacent said oven or furnace 10 is a heating device 13 illustrated as of the gas heating type and while any suitable heating device could be used, the same illustrated is substantially like that disclosed in applicant's U. S. Patent No. 2,231,445 granted February 11, 1941. Said heater 13 has hot gases or products of combustion delivered thereto by a burner 14 which will be called the regular burner. Said burner is supplied with fuel such as a gas through a pipe 15. Pipe 15 is equipped with a manually operable cock 16. Pipe 15 communicates through a connection 17 with a main fuel supply pipe or conduit 18, which latter is equipped with an automatically operated solenoid control valve 19. Valve 19 has electrical conductors 20 connected thereto. Conduit 18 is provided with a manually operable main control cock 21. Air under suitable pressure is supplied to burner 14 through a pipe or conduit 23. Pipe 23 has therein an automatically operated valve 24 which is controlled through a lever 25 operated from a motor 26. Motor 26 is electrically operated and has conductors 27 connected thereto. Pipe 23 is also equipped with a manually operable valve or blast 28. Pipe 23 is connected through suitable connections to the main air supply pipe 30 and pipe 30 has mounted therein an automatically operated safety pressurestat 31. Member 31 is shown as having conductors 32 connected thereto. Air is supplied to conduit or pipe 30 by a fan or blower 32 driven from a suitable electrical motor 33.

Heat is also supplied to the heating device 13 by another burner 35 which may be called an auxiliary or surge burner. Fuel such as a combustible gas is supplied to burner 35 through a pipe or conduit 36 which also connects through connection 17 to the main fuel supply conduit 18. Conduit 36 is equipped with a manually operable cock 37 and with an electrically operated solenoid control valve 38. Control valve 38 is shown as having conductors 39 connected thereto. Air is supplied to burner 35 through a pipe or conduit 41 which communicates through suitable connections with the main air supply pipe 30. Pipe 41 is equipped with a manually operatable valve or blast gate 42 and is also equipped with an automatically operated valve 43 which is controlled through a lever 44 operated by a motor 45, which latter has conductors 40 extending thereto. A pilot burner 46 is provided, the same being illustrated as disposed between burners 14 and 35, said pilot burner being supplied with fuel through a pipe 47. An electrode 45 is provided for the pilot burner and a spark plug 45a is also provided for igniting the pilot burner. Pipe 47 is equipped with a manually operable cock 48 and with an automatically operated solenoid control valve 49. Conductors 50 are illustrated as extending to valve 49. Pipe 47 is also equipped with an automatically operated safety pressurestat or pressure limiting switch or means 51, the same being shown as provided with conductors 52. Pipe 47 is connected through suitable connections 22 to main fuel supply pipe 18. Air is supplied to the pilot burner 46 through a pipe or conduit 54 which is equipped with a manually operable cock 55. Conduit 54 communicates through suitable connections with the main air supply pipe 30. Fuel pipes 15, 36 and 47 are each equipped with zero gas pressure governors numbered 57, 58 and 59 respectively. These governors have the function of automatically maintaining a zero gas pressure on the burner side of the governor. The heated air and products of combustion pass from the heater 13 through a discharge conduit 60 and are drawn through said conduit by a circulating fan 61. Said heated gases are discharged from fan 61 through conduits 62 and 63 which have expanding portions 62a and 63a connected to conduits 64 and 65 through which the heated gases are delivered to the chamber 10b. Fan 61 is driven through a shaft 66 having connected thereto a pulley 67 over which runs a belt 68 also running over a pulley 69 secured to the driving or armature shaft of an electric motor 70. Heater 13 is provided with an air inlet conduit 13a having an inlet end controlled by a damper 72, which damper is operated through a lever 73 in turn controlled and operated from an electrically operated motor 74. Heating device 13 also has connected thereto a conduit 77 having an open end communicating with chamber 10b for the purpose of drawing a greater or lesser quantity of gases from chamber 10b for recirculation through the heater. An air exhaust fan 80 is provided having an intake conduit 81 which has open ends communicating with chamber 10b and the opening into which is regulated by a damper 82 adapted to be operated by a lever 83 in turn controlled and operated by an electric motor 84. Motor 84 is shown as having conductors 85 extending thereto. Fan 80 has a discharge conduit 86. Fan 80 is driven through a shaft 87 having connected thereto a pulley 88 over which runs a belt 89 also running over a pulley 90 secured to the driving or armature shaft of an electric motor 91.

Figure 5:
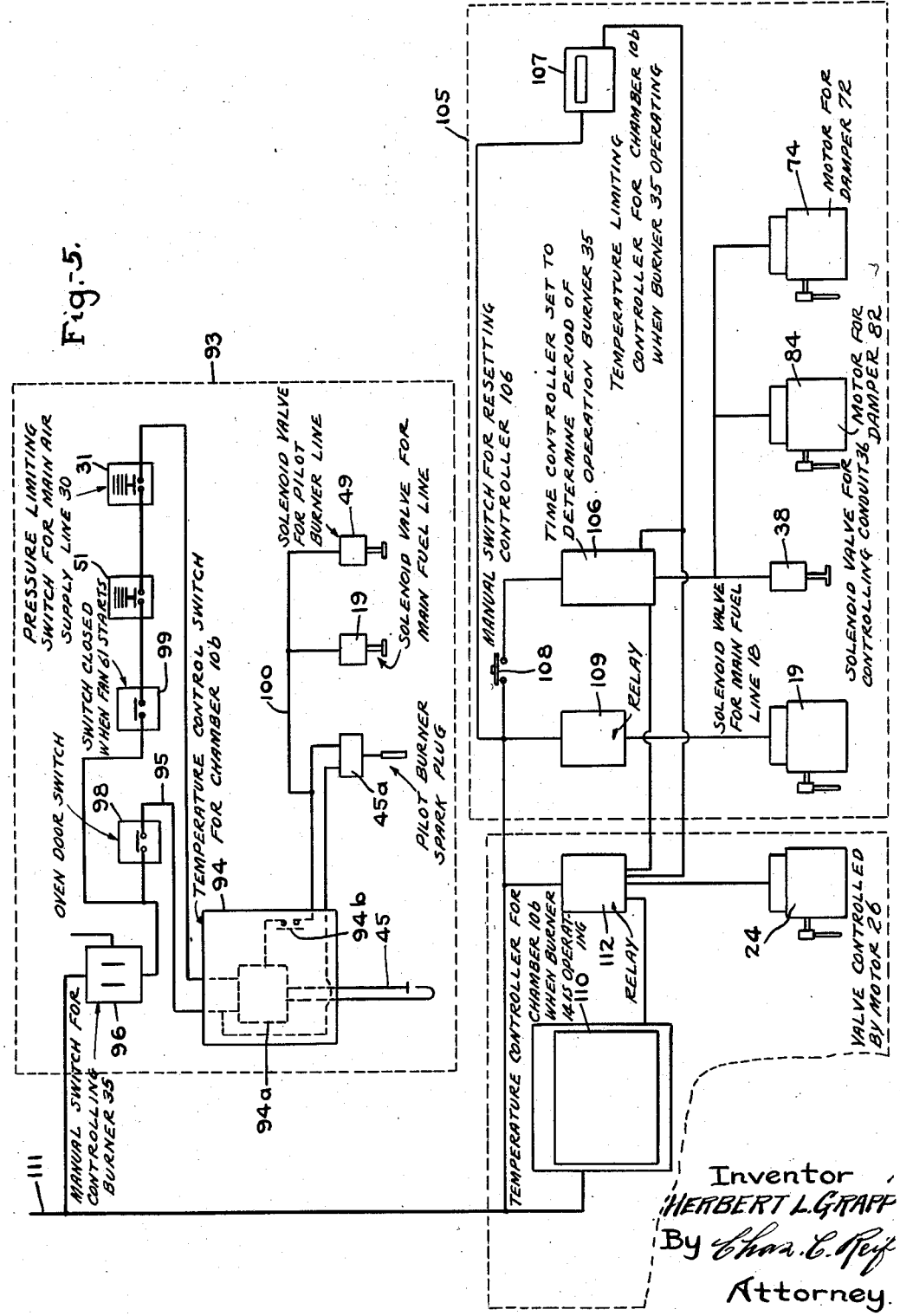
Fig. 5 is a diagrammatic view of certain parts of the apparatus and controls therefor.

In Fig. 5 certain parts are diagrammatically shown with their associated controllers. Within the line 93 a safety controller 94 is shown. This controller acts to control the temperature to which the chamber 10b can be raised. This controller is connected by suitable conductors 95 to a manually operated switch 96 for controlling the surge burner. Switch 96 is suitably connected by electrical conductors 97 to an oven door switch 98. This switch is also indicated in Fig. 1. The switch 98 is closed when an oven door 10c is opened. This sets the safety system or circuit and permits the opening of the valves 48 and 55 in the fuel and air lines of the pilot burner 46. If the pilot burner is lighted when the oven doors are closed there is danger of igniting a combustible mixture in the oven which would cause damage. An automatically operated control switch 99 for fan motor 70, the valve 51 and the pressurestat 31 are also connected in circuit with switch 96 and controller 94. Controller 94 is also connected in circuit by suitable conductors 100 with the spark plugs 45a, the automatically operated valve 19 in the fuel line and the automatically operated solenoid valve 49 in the fuel line of the pilot burner. The controller 94 includes a relay 94a which is connected in circuit with the spaced electrodes 45. A circuit including electrodes 45 acts to cut off the gas supply if pilot burner does not ignite. Controller 94 also has a controlling switch 94b. The operator holds switch 94b closed until the flame appears. Switch 99 is an air-flow switch which closes when air-circulating fan 61 starts. The parts within the dotted line 93 comprise a safety control system.

The parts within dotted line 105 comprise the control system for the auxiliary or surge burner 35. An automatic timing controller 106 is provided for the burner 35 and a temperature limiting controller 107 is provided which can be set to limit the temperature of chamber 10b when the burner 35 is operating. The timer 106 can be reset or placed in operation by a manually operated switch 108. A relay 109 is in circuit with timer 106 and controller 107 and this controls the automatically operated valve 18 in the air line of the burner 35. Timer 106 is connected in circuit with the automatically operated valve 38 in the fuel line for burner 35. The motor 74 of exhaust fan control damper 82 is connected in circuit with timer 106 as is also the motor for operating the damper 72 in the air supply conduit 13a. A temperature controller for chamber 10b when the regular burner 14 is operating, is shown as 110 and this together with switch 96, are connected by suitable conductors to the current supply line 111. Controller 110 is connected to an automatically operated relay 112 which is in turn electrically connected to the motor 26 of the automatically operated valve 24 in the air supply line of burner 14.

With the parts above described the oven is placed in operation by closing manually operated switches not shown for operating the motors 33, 70 and 91 of the air pressure blower for the burners, the circulating air fan 61 and the exhaust fan 80 respectively. These fans and blower will thus start to operate. Damper 72 and damper 82 are at this time suitably adjusted to give a certain inlet of air to the gas heater and a certain exhaust of air from chamber 10b, respectively. The starting of air circulating fan 61 causes the automatic control switch 99 to close and the operation of air pressure blower 32 causes the safety pressurestat switch 31 to close. The main gas valve or cock 21 is now opened and the safety pressurestat valve 51 is placed in operation. An oven door 10c is now opened which closes the safety door switch 98. This permits or makes it safe to open the pilot valves 48 and 55. This is done manually. Manual switch 96 is closed and this places the safety controller 94 in operation and opens valves 19 and 59. This allows air and gas to flow to the pilot burner. With the closing of switch 96 and operation of controller 94 current is supplied to the spark plugs 45a and the pilot burner is thus placed in operation. The switch 94b of controller 94 is held in closed position until switch 99 of the air circulating fan closes after which the relay 94a in the safety controller holds the circuit closed and at the same time shuts off the circuit to the spark plug 45a and to the door switch 98. This allows the oven doors to be now opened and closed as long as the pilot burner 46 is in operation. When the pilot burner 46 is in operation the temperature controller 110 is set to control the temperature in chamber 10b at what might be called the normal oven temperature for the particular article being treated or product being dried in chamber 10b. The motorized lever valve 24 is opened by controller 110 through relay 112 and the blast gate or valve 28 and the gas cock 16 are now opened allowing fuel and air to be supplied to the regular burner 14 which will be ignited and put in operation by the pilot burner 46. The apparatus is now in complete operation except for the use of the auxiliary or surge burner 35. If the apparatus were allowed to operate with said parts the chamber 10b would come to the normal temperature for which temperature controller 110 would be set and would be maintained at this temperature by said controller.

To place the auxiliary or surge burner 35 in operation the gas cock 37 and the valve or blast gate 42 are opened. The operator will set the surge timer 106 for the desired number of minutes that it is desired to have burner 35 operate. The controller 107 will also be set for the maximum temperature to be attained in chamber 10b. When the time controller 106 is moved off of zero position to the indicated time desired, valves 18 and 38 are opened and burner 35 is supplied with air and fuel and ignited by the other burners. The setting of timer 106 also actuated relay 112 so that it holds the automatic or motorized lever valve 24 open and renders it incapable of operation by the temperature controller 110 so that the temperature in chamber 10b can rise above that for which controller 110 is set. Thus even tho the temperature in chamber 10b rises above the temperature for which controller 110 is set the latter will not operate to cut off any heat. Setting the timer 106 also closes the circuits to the motors 74 and 84 of dampers 72 and 82 causing said dampers to assume a full open position. The burner 35 is now in operation, and the temperature in chamber 10b will be raised to quite a high point or additional heat will be supplied to quickly bring the articles to be heated to the desired temperature. The period of operation of burner 35 is set according to the material being treated in the chamber 10b. At the end of the period for which timer 106 is set said timer operates and opens the circuit of motor 18 operating valve 43 and also opens the circuit of the solenoid valve 38 causing valves 43 and 38 to close. The auxiliary or surge burner 35 is thus extinguished. The action of the timer also opens the circuit of damper motors 74 and 84 so that dampers 72 and 82 move to their previous adjusted position. Relay 109 is deenergized and the temperature in chamber 10b again comes under the control of the regular temperature controller 110. When it is again desired to put the surge burner in operation the reset manually operated switch 108 will again be closed.

During the operation of the auxiliary or surge burner 35 the temperature in the furnace as stated, is raised to quite a high point or enough additional heat is supplied to quickly bring the articles to be heated up to the desired temperature. This point is much above that which has previously been used to bring the material treated up to the desired definite temperature.

The graph shown in Fig. 6 illustrates an actual operation on a specific material. In this graph the curve C shows the air temperature in chamber 10b as would be used for the said material by heating the chamber 10b without the auxiliary or surge burner 35. The curve D illustrates the temperature of the material being treated without the use of the surge burner 35. It will be noted that the temperature of the material lags below the temperature of the chamber. The amount of this difference or lag in temperature will vary according to the heat conductivity, specific heat, density and thickness, the shape of the articles and the surface exposed. Experience has shown that there is also a resistance to heat due to the skin protection on metal. If the articles were heat-treated without the surge burner 35 or the surge heating the completion of the regular treatment would be at the point C' on the graph. The curve A illustrates the temperature of the chamber 10b when the auxiliary or surge burner 35 is used. The curve B illustrates the temperature of the material being treated when the surge burner is used. It will be seen that the desired definite temperature of the material is attained much more quickly than when the apparatus is used without the surge or auxiliary burner. The material must not be overheated and as above stated, the timer 106 and the temperature controller 107 are set according to the best experience and in accordance with the specific material being treated. It is the aim and purpose to cut off the auxiliary or surge burner at about or shortly before the time the material reaches the desired definite temperature. The high point on curve A in the graph shows when the auxiliary or surge burner 35 was cut off. It will be seen by the curve B that the material has practically reached the temperature at which it is desired to maintain it. There is enough heat supplied so that the articles soon come up to the desired temperature even with the burners extinguished. After the auxiliary or surge burner 35 is cut off the temperature of chamber 10b drops as shown by the descending portion of curve A. In practice when the auxiliary burner 35 is cut off the regular burner is also extinguished. The temperature in chamber 10b is above that for which controller 110 is set so that burner 14 cannot operate. The temperature of the chamber will now drop rather rapidly and it will be permitted to drop down to the point indicated by the horizontal portion of curve A representing in the specific instance about 270 degrees F. By the time the temperature of the furnace had dropped down to this desired or controlled point the temperature of the material as shown by curve B has reached the desired definite point at which it is to be maintained. When the temperature of the furnace drops down to the desired point which as shown in Fig. 6, is 270 degrees, the temperature controller 110 will again bring on the main burner and this will be operated to maintain said temperature of 270 degrees in the chamber and to maintain the temperature of the articles being treated at a substantially uniform point. With the use of the surge burner the heat-treatment can be terminated at the point A' as shown in Fig. 6. As stated, without the use of the surge burner the treatment could end at the point C. This represents a saving in time of 12½ minutes by the use of the surge burner or surge heating. The material is much more quickly brought up to the desired definite point and yet it is not overheated. With previous methods where the temperature of the treating chamber was merely brought up to the point at which it was later maintained, there was considerable loss in production time and naturally a loss in efficiency of operation of the furnace or oven. As shown in the graph in Fig. 6, when only the regular burner was used it took about twenty minutes for the furnace to come up to the 270 degree temperature. This is indicated by the curve C. The temperature of the material as shown by the curve D was much lower. The use of the auxiliary burner or the surge heating thus results in eliminating the large lag in temperature of the material being treated. The material is much more quickly brought to the desired definite temperature and the total time of operating is greatly reduced. In the specific instance illustrated in Fig. 6, the temperature of the material was taken with a thermocouple embedded in a ten-gauge steel plate. The maximum temperature of the chamber during surge heating of course has to be regulated or controlled and the time of the surge heating is also definitely controlled. The exhaust fan damper is open during the surge heating in order to remove volatile matter, water vapor, fumes or other gases resulting from the quick and high heating of the material. At the completion of the surge heating or when auxiliary burner 35 is shut off, this damper returns to its normal set position in order to conserve the heat of the chamber. The temperature controller 110 controls the temperature of the chamber during the operation of the normal burner. In practice a temperature recorder having a visible indicator is used so that the operator will have a current and accurate picture of the conditions in the heating chamber and can of course, regulate the surge temperature and length of the surge heating accordingly. When articles or materials are being treated which heat readily the temperature in the chamber during the surge period may not rise much if any above the desired temperature of the said articles or materials. They are however, quickly brought to said desired temperature. The present method and apparatus using the auxiliary or surge burner 35 is applicable to practically all types of heat processing, baking of enamels and varnishes on metal, heating of plastics, heat-treating of all types of metals, core baking and various kinds of chemical drying.

From the above description it will be seen that I have provided a novel and very efficient method and apparatus for heating of various materials. The method and apparatus result in a great saving of time and greatly add to the efficiency of the operation. The articles are very effectively treated and yet any overheating is prevented. The method and apparatus have been amply demonstrated in actual practice, found to be very successful and efficient and are being commercially operated and made.

It will, of course, be understood that various changes may be made in the form, details, arrangement and proportions of the apparatus and in the steps and sequence of steps of the method without departing from the scope of applicant's invention, which generally stated, consists in a method and apparatus capable of carrying out the objects above set forth, such as disclosed and defined in the appended claims.

What is claimed is:

1. The method of heating a chamber adapted to contain articles to be heated which consists in supplying a large amount of heat to said chamber by separately controlled heat supplying means to very quickly bring said articles up to substantially a certain definite temperature then discontinuing the supply of heat by one of said means and supplying heat only by the other of said means to maintain said articles substantially at said definite temperature, with the additional step of removing gases from said chamber during the operation of said auxiliary burner.

2. A heat treating apparatus having in combination, a heat treating chamber, means for supplying heated gases to said chamber, means for limiting the temperature of said chamber to a normal point in accordance with the articles to be heat treated, a burner for said first mentioned means for supplying heat to raise the temperature of said chamber to said point, an auxiliary burner for supplying additional heat to said first mentioned means to quickly raise the temperature of said chamber to a point greatly above said first mentioned point to quickly bring said articles to the temperature to which they would eventually be heated by said chamber at said normal point, means for limiting the time of operation of said auxiliary burner in accordance with the particular articles being treated, inlet and exhaust conduits for said chamber, control members for said conduits, and means for moving said control members to open said conduits when said auxiliary burner is placed in operation.

3. An apparatus for heat treating articles in a chamber heated by hot gases having in combination, a chamber adapted to receive said articles and hot gases, a main burner, a manually operated switch for controlling said burner, an auxiliary burner, a manually operated switch for controlling said auxiliary burner, a time controller for said auxiliary burner adapted to be set for extinguishing said auxiliary burner after a certain period, a temperature limiting means for said chamber placed in operation when said time controller is set and rendered inoperative after said period, a second temperature limiting means for said chamber, means for rendering said second temperature limiting means operative when said auxiliary burner is extinguished, a heating device for said chamber to which products of combustion from said burners are delivered, air inlet and air exhaust dampers for said heating device, and means for moving said dampers to full open position when said time control means is set.

HERBERT L. GRAPP.

REFERENCES CITED

The following references are of record in the file of this patent:

UNITED STATES PATENTS

| Number | Name | Date |
|---|---|---|
| 1,356,804 | Brewer | Oct. 26, 1920 |
| 1,377,952 | Wilkes | May 10, 1921 |
| 1,391,996 | Collins | Sept. 27, 1921 |
| 1,650,889 | De Florez | Nov. 29, 1927 |
| 1,731,315 | Mueller | Oct. 15, 1929 |
| 1,815,051 | De Florez | July 21, 1931 |
| 1,849,163 | Wilhjelm | Mar. 15, 1932 |
| 1,977,216 | Unger | Oct. 16, 1934 |
| 2,046,718 | Bletz | July 7, 1936 |
| 2,051,401 | Winterstein | Aug. 18, 1936 |
| 2,133,673 | Spencer et al. | Oct. 18, 1938 |
| 2,282,489 | Madlem | May 12, 1942 |

OTHER REFERENCES

Fig. 337, vol. II, second edition of Trink's Industrial Furnaces, published by John Wiley & Sons, New York, N. Y.